(12) United States Patent
Chaney et al.

(10) Patent No.: US 7,151,753 B2
(45) Date of Patent: Dec. 19, 2006

(54) SYSTEM AND METHOD FOR ESTABLISHING A CONFERENCE CALL

(75) Inventors: Adam Chaney, Plano, TX (US); Conor Brady, Dallas, TX (US); Paul Tidwell, Rowlett, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1075 days.

(21) Appl. No.: 10/060,747

(22) Filed: Jan. 30, 2002

(65) Prior Publication Data

US 2003/0108002 A1 Jun. 12, 2003

Related U.S. Application Data

(63) Continuation of application No. 10/013,093, filed on Dec. 7, 2001.

(51) Int. Cl.
*H04L 12/18* (2006.01)

(52) U.S. Cl. ..................... 370/261; 370/432

(58) Field of Classification Search ............... 370/261, 370/263, 271, 270
See application file for complete search history.

(56) References Cited

U.S. PATENT DOCUMENTS

| 5,815,665 | A | 9/1998 | Teper et al. | |
|---|---|---|---|---|
| 6,480,861 | B1 | 11/2002 | Kanevsky et al. | |
| 2002/0078153 | A1* | 6/2002 | Chung et al. | 709/204 |
| 2005/0226172 | A1* | 10/2005 | Richardson et al. | 370/260 |

FOREIGN PATENT DOCUMENTS

| WO | WO 99 44155 A | 9/1999 |
|---|---|---|
| WO | WO 01 61920 A | 8/2001 |
| WO | WO 02 54270 A | 7/2002 |

OTHER PUBLICATIONS

Napolitano A. et al/: "UMTS all-IP Mobility Managment, Call and session control Procedure" INTERNET, Mar. 24, 2000, XP002149519 Retrieved from the internet: URL:http://195.103.28.224/ricagni/draft-ricagni-megaco-umts-allip-00.pdf retrieved on Oct. 2, 2000! p. 4, line10-line 30 and p. 9, line 6-p. 10, line 8.
Schulzrinne H et al.: "The Session Initiation Protocol: Internet-Centric Signaling" IEEE Communications Magazine, IEEE Service Center, Piscataway, N.J., US, vol. 38, No. 10, Oct. 2000, pp. 134-141, XP000969736 ISSN: 0163-6804 the whole document.

* cited by examiner

*Primary Examiner*—Hassan Kizou
*Assistant Examiner*—Salman Ahmed (57) ABSTRACT

A system and method for establishing a conference call in an Internet Protocol (IP) telecommunications network between a conference owner and a plurality of other conference participants. The IP network includes a conference server and at least one Call State Control Function (CSCF). The CSCF includes a Presence and Instant Messaging (PIM) server that notifies the conference server when participants are present and available. A first user is registered with the conference server as the conference owner, and the owner identifies the conference participants and provides criteria for initiating the conference. The conference server identifies each participant's serving CSCF, and sends a request to A each CSCF to notify the conference server when served participants are present and available. When the predefined number of participants are present and available, the conference server initiates the conference call.

12 Claims, 10 Drawing Sheets

SYSTEM AND METHOD FOR ESTABLISHING A CONFERENCE CALL

RELATED APPLICATIONS

This nonprovisional application is a continuation of copending U.S. nonprovisional patent application Ser. No. 10/013,093 entitled, "Service Access System and Method in a Telecommunications Network", filed Dec. 7, 2001 in the names of Adam Chaney, Conor Brady, and Paul Tidwell, which is hereby incorporated by reference for all purposes.

BACKGROUND OF THE INVENTION

1. Technical Field of the Invention

This invention relates to telecommunication systems. More particularly, and not by way of limitation, the invention is directed to a system and method for establishing a conference call in a telecommunications network utilizing the Session Initiation Protocol (SIP).

2. Description of Related Art

Wireless telecommunication networks are evolving from second generation (2G) circuit-switched networks to third generation (3G) packet-switched networks. A reference architecture for a 3G wireless network is being developed by the Third Generation Partnership Project (3GPP). The 3GPP network architecture uses the Session Initiation Protocol (SIP) developed by the Internet Engineering Task Force (IETF) for call setup signaling. Media is then transported through an existing IP network. The SIP standard is described in RFC 2543 which is hereby incorporated in its entirety by reference herein.

In a SIP network, users register their existence on a sub-network through a Call State Control Function (CSCF). Each user has a unique SIP ID which is an address which follows the user to different terminals. For example, when a user sits at his office desk, he can register himself as being at his desk. The desk phone sends a SIP REGISTER message with the user's unique SIP ID and the phone's hardware device ID to the CSCF so that it knows where to route the user's calls. The REGISTER message also contains a presence state that indicates the current status of the user. For example the user may designate that he is at his desk, but is currently not available.

The presence state in the REGISTER message is routed to a Presence and Instant Messaging (PIM) Server associated with the CSCF. The PIM server provides the user's presence state to other users on the network and also enables the user to monitor the presence state of other users. The user can determine the other party's presence state (for example, registered, not registered, busy, etc.) from a display such as a telephone or computer display at his desk before placing a call.

An originating user need not specify the exact destination address associated with the destination user. The 3GPP network uses aliases associated with particular users to automatically determine the identity of their registered terminals or devices, and to automatically format and deliver communications with the registered devices over an existing IP network. Thus, the 3GPP network architecture provides a centralized and independent communication control mechanism. For a registered user, the 3GPP network and associated elements keep track of the user's exact location and the identity of the user's registered terminal, and accordingly route and enable communication with that registered user over the existing IP network.

A typical service offered to subscribers in a telecommunications network is a conferencing service for setting up conference calls between three or more parties. In the 3GPP network architecture, a conference server invites the different parties to the call during call setup, and mixes and routes the media once the call is set up. The conference server may be internal or external to the CSCF network, but the user requesting the service must know the conference server's network ID. A client user, given the ID of the server, can send a message such as a SIP REFER message to the server requesting that the server initiate a conference call. For User-A to initiate a conference call to User-B and User-C, User-A sends three REFER messages to the conference server identifying the three parties to the conference call. The REFER messages may be sent directly from User-A to the conference server, or may be sent through the CSCF network. The conference server then sends out SIP INVITE messages to Users-A, B, and C. When everyone has joined the call, the conference bridge in the server performs the media mixing. This solution, however, requires that the user requesting the service know the network ID of the conference server.

A problem arises, however, when a user desires to use a service that is resident on a particular server, and the user does not know the IP address or host name of the server. For example, in the context of a conference call, the user desiring to set up the conference call may not know the network ID such as the IP address or other host name of the conference server. Without the network ID of the conference server, the user cannot communicate with the conference server to access the conferencing service and set up the conference call.

In a proposed solution, the user sends a multicast message through the network asking whether any conference servers are available. However, this is not a reliable solution since there may not be any conference servers available, or the only responding server may be too many hops away.

It would be advantageous, therefore, to have a system and method of providing access to a service in a telecommunications network when the user does not know the network ID of the server providing the service. It would also be advantageous to have a system and method for automatically establishing a conference call when predefined criteria are met. The present invention provides such a system and method.

SUMMARY OF THE INVENTION

The present invention provides a system and method for a service node in a telecommunications network to generically register itself as having specified service types, and having certain capabilities associated with the types of services that it offers. A modified Presence and Instant Messaging (PIM) server then provides this service capability information to users who subscribe to the service. In this way, the user is provided access to a service when the user does not know the network ID of the server providing the service.

In one aspect, the present invention is directed to a method of establishing a conference call in an Internet Protocol (IP) telecommunications network between a first user as a conference owner and a plurality of other users as conference participants. The IP network includes a conference server and at least one Serving Call State Control Function (S-CSCF) providing call control functions for the users. The first user is registered with a first S-CSCF as the conference owner, and the conference participants are identified to the first S-CSCF. The first S-CSCF identifies each participant's assigned S-CSCF, and sends a request to each participant's S-CSCF requesting each S-CSCF to notify the first S-CSCF when a predefined criterion for initiating the conference call has been met by the participant being served by the participant's S-CSCF. Each participant's S-CSCF then detects when each participant has met the predefined criterion, and sends a notification to the first S-CSCF. The first S-CSCF then determines whether the participants have met the predefined criterion for initiating the conference call, and if so, instructs the conference server to initiate the conference call.

In another aspect, the present invention is directed to a system in an Internet Protocol (IP) telecommunications network for establishing a conference call between a first user as a conference owner and a plurality of other users as conference participants. Each of the users is served by an S-CSCF that provides call control functions for the users. The system includes a first S-CSCF serving the first user, a conference server, and a Presence and Instant Messaging (PIM) server in each participant's S-CSCF. The first S-CSCF includes means for registering the first user as the conference owner and receiving from the owner, identifications of the conference participants. The first S-CSCF also includes means for identifying each participant's assigned S-CSCF, and communication means for sending a request message to each participant's S-CSCF and receiving a notification from each participant's S-CSCF. The request message requests the participant's S-CSCF to notify the first S-CSCF when a predefined criterion for initiating the conference call has been met by the participant being served by the participant's S-CSCF. The first S-CSCF also includes means for determining whether the participants have met the predefined criterion for initiating the conference call, and means for instructing the conferencing means to initiate the conference call upon determining that the participants have met the predefined criterion. The conferencing means initiates and conducts the conference call when instructed by the first S-CSCF. The PIM server in each participant's S-CSCF includes means for determining whether each participant has met the predefined criterion, and communication means for sending the notification to the first S-CSCF when each participant being served by the participant's S-CSCF has met the predefined criterion.

In yet another aspect, the present invention is directed to an owner's S-CSCF in an IP telecommunications network. The owner's S-CSCF serves a conference owner and instructs a conference server to initiate a conference call between the conference owner and a plurality of conference participants when predefined criteria have been met. The owner's S-CSCF includes means for registering the conference owner and receiving from the owner, identifications of the conference participants; and means for identifying each participant's S-CSCF. The owner's S-CSCF also includes communication means for sending a request to each participant's S-CSCF requesting the participant's S-CSCF to notify the owner's S-CSCF when a predefined criterion for initiating the conference call has been met by the participant being served by the participant's S-CSCF, and for receiving a notification from each of the participant's S-CSCFs when the participant being served by the participant's S-CSCF has met the predefined criterion. The owner's S-CSCF also includes means for determining whether the participants have met the predefined criterion for initiating the conference call; and means for instructing a conference server to initiate and conduct the conference call upon determining that the participants have met the predefined criterion.

In still yet another aspect, the present invention is directed to a method of establishing a conference call in an IP telecommunications network between a first user as a conference owner and a plurality of other users as conference participants. The IP network includes a conference server and at least one Call State Control Function (CSCF) providing call control functions for the users. The method includes the steps of registering with the conference server, the first user as the conference owner; identifying by the conference owner, the conference participants; and identifying by the conference server, each participant's CSCF. The conference server sends a request to each participant's CSCF requesting the CSCF to notify the conference server when a predefined criterion for initiating the conference call has been met by the participant being served by the CSCF. Each participant's CSCF detects when each participant has met the predefined criterion, and sends a notification to the conference server when each participant being served by the CSCF has met the predefined criterion. This is followed by determining by the conference server whether the participants have met the predefined criterion for initiating the conference call, and initiating the conference call upon determining that the participants have met the predefined criterion.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
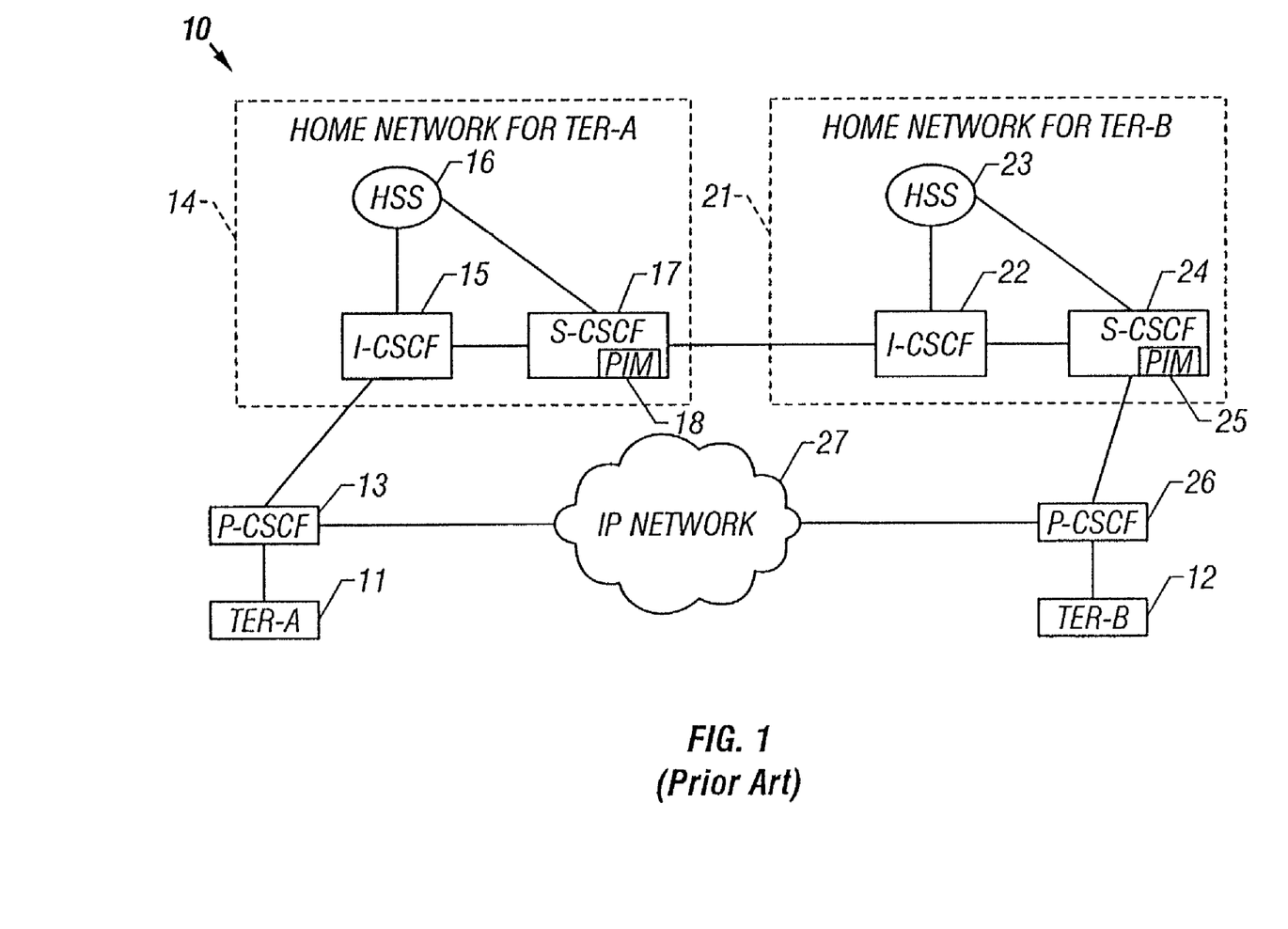
FIG. 1 (Prior Art) is a simplified block diagram of a portion of a typical 3GPP network architecture.

In the drawings, like or similar elements are designated with identical reference numerals throughout the several views thereof, and the various elements depicted are not necessarily drawn to scale. Referring now to FIG. 1, a block diagram of a portion of a typical 3GPP network architecture 10 is depicted. The portion illustrated is suitable for setting up a call between an originating user utilizing Terminal-A 11 and a terminating user utilizing Terminal-B 12. A principal node in the 3GPP architecture is the Call State Control Function (CSCF). Each of the parties has an associated CSCF. The CSCF is essentially a switch that provides the parties with access to the network and routes the call setup signaling between the parties. Each CSCF includes a Proxy CSCF (P-CSCF), an Interrogating CSCF (I-CSCF) and a Serving CSCF (S-CSCF).

The P-CSCF is the first point of contact for a user registering with the network. When Terminal-A 11 registers, the originating P-CSCF 13 determines the home network 14 associated with the originating user and performs authentication and verification with the specified home network. When Terminal-A originates a call, the originating I-CSCF 15 queries an originating Home Subscriber Server (HSS) 16 associated with Terminal-A for user information. The HSS is the master database for a given user and is the network entity containing the subscription-related information to support the network entities actually handling the call/session. The HSS is further used to determine and locate the originating user's S-CSCF 17. The originating S-CSCF provides service invocation and other user features available to the subscribed users. The originating S-CSCF also includes a Presence and Instant Messaging (PIM) server 18.

The terminating (called) user also has an associated home network 21. The terminating home network includes a terminating I-CSCF 22, a terminating HSS 23, and a terminating S-CSCF 24 having a PIM server 25. Terminal-B registers with the terminating home network through a terminating P-CSCF 26. Once call setup is complete, media is exchanged between the two parties via an IP network 27.

Figure 2:
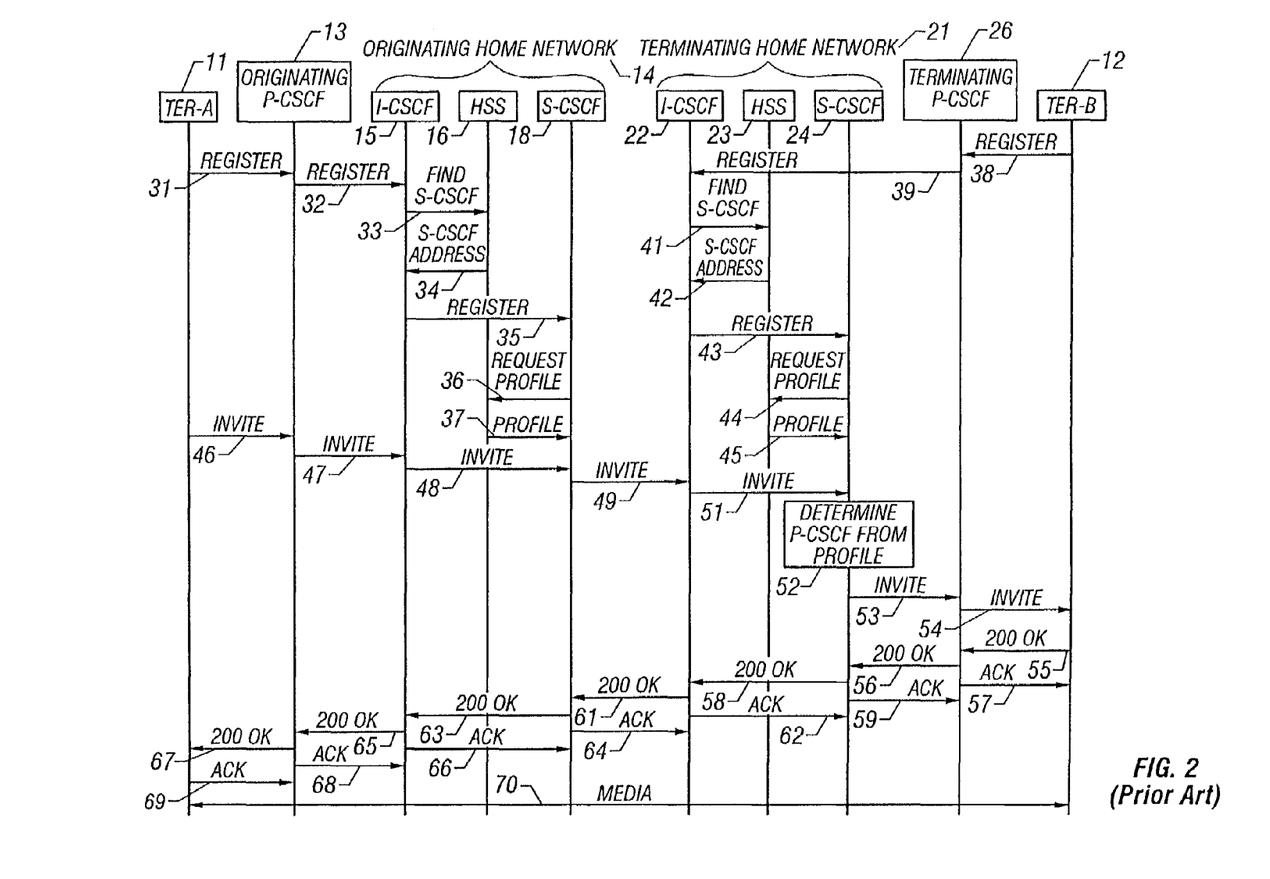
FIG. 2 (Prior Art) is a signaling diagram illustrating typical call setup signaling utilizing SIP signaling in the 3GPP network architecture of FIG. 1.

FIG. 2 is a signaling diagram illustrating typical call setup signaling utilizing SIP signaling in the 3GPP network architecture of FIG. 1. First, the two terminals register with the network. Terminal-A 11 sends a REGISTER message 31 to the originating P-CSCF 13. The originating P-CSCF uses the domain specified in the "From" field of the REGISTER message to determine the home network 14 associated with that particular user, and performs authentication and verification with the specified home network. The Domain Name Server (DNS) record for the home network points to the originating I-CSCF, and at step 32, the P-CSCF sends the REGISTER message to the originating I-CSCF 15. At step 33, the I-CSCF queries the originating HSS 16 associated with that particular originating subscriber for the address of the originating user's current S-CSCF 18. At step 34, the HSS returns the address of the current originating S-CSCF to the originating I-CSCF where the information is cached.

At step 35, the REGISTER message is forwarded to the originating S-CSCF 18. At 36, the originating S-CSCF queries the originating HSS for User-A's profile information to determine what telephony features the originating user has subscribed to or activated, such as call blocking, call forwarding, voice mail, and the like. At step 37, the HSS returns the profile information to the originating S-CSCF where the information is cached.

Likewise, Terminal-B 12 sends a REGISTER message 38 to the terminating P-CSCF 26. The terminating P-CSCF determines the home network 21 associated with that particular user from the REGISTER message and performs authentication and verification with the specified home network. At 39, the REGISTER message is forwarded to the terminating I-CSCF 22. The terminating I-CSCF queries the terminating HSS 23 at step 41 to identify and locate the terminating S-CSCF 24 where the destination subscriber is currently registered. At step 42, the address of the terminating S-CSCF is returned to the terminating I-CSCF where the information is cached. At step 43, the REGISTER message is forwarded to the terminating S-CSCF 24. At step 44, the terminating S-CSCF queries the terminating HSS for User-B's profile information to determine what telephony features the terminating user has subscribed to or activated. At step 45, the terminating HSS returns the profile information to the terminating S-CSCF where the information is cached.

Thereafter, Terminal-A 11 initiates call setup to Terminal-B by sending a SIP INVITE message 46 to the originating P-CSCF 13. SIP enabled multimedia communications include, but are not limited to, voice, video, instant messaging, presence, and a number of other data communications. At step 47, the INVITE message is forwarded to the originating I-CSCF 15 associated with the home network for the originating subscriber, and at 48, the SIP INVITE message is forwarded to the previously identified S-CSCF 18.

The originating S-CSCF 18 provides service invocation and other user features available to Terminal-A 11. Upon verifying that this particular user is able to initiate this particular call connection, the originating S-CSCF then transmits the SIP INVITE message at step 49 to the terminating I-CSCF 22 associated with the home network 21 of the terminating subscriber. At 51, the INVITE message is then forwarded to the terminating S-CSCF. At 52, the terminating S-CSCF determines from the terminating user's profile, the P-CSCF 26 currently serving the terminating Terminal-B 12. At 53, the INVITE message is forwarded to the terminating P-CSCF which then forwards it to Terminal-B at step 54.

Terminal-B 12 responds with a SIP 200 OK message at 55. The terminating P-CSCF 26 forwards the 200 OK message to the S-CSCF 24 in Terminal-B's home network at 56 and sends an Acknowledgment (Ack) 57 back to Terminal-B. The terminating S-CSCF sends the 200 OK message to the terminating I-CSCF 22 at 58 and sends an Acknowledgment 59 back to the terminating P-CSCF. At 61, the terminating I-CSCF 22 sends the 200 OK message to the originating S-CSCF 18 in Terminal-A's home network 14, and sends an Acknowledgment 62 back the terminating S-CSCF.

The originating S-CSCF 18 forwards the 200 OK message at 63 to the originating I-CSCF 15 and sends an Acknowledgment 64 back to the terminating I-CSCF 22. At 65, the originating I-CSCF 15 sends the 200 OK message to the originating P-CSCF 13 and sends an Acknowledgment 66 back to the originating S-CSCF 18. At 67, the originating P-CSCF 13 sends the 200 OK message to Terminal-A 11 and returns an Acknowledgment 68 to the originating I-CSCF 15. Finally, at 69, Terminal-A sends an Acknowledgment to the originating P-CSCF 13. Once the destination terminal has been identified and acknowledged, a data channel 70 is directly established between the two terminals over the existing IP network 27, and no further participation is required by the 3GPP network.

Figure 3A:
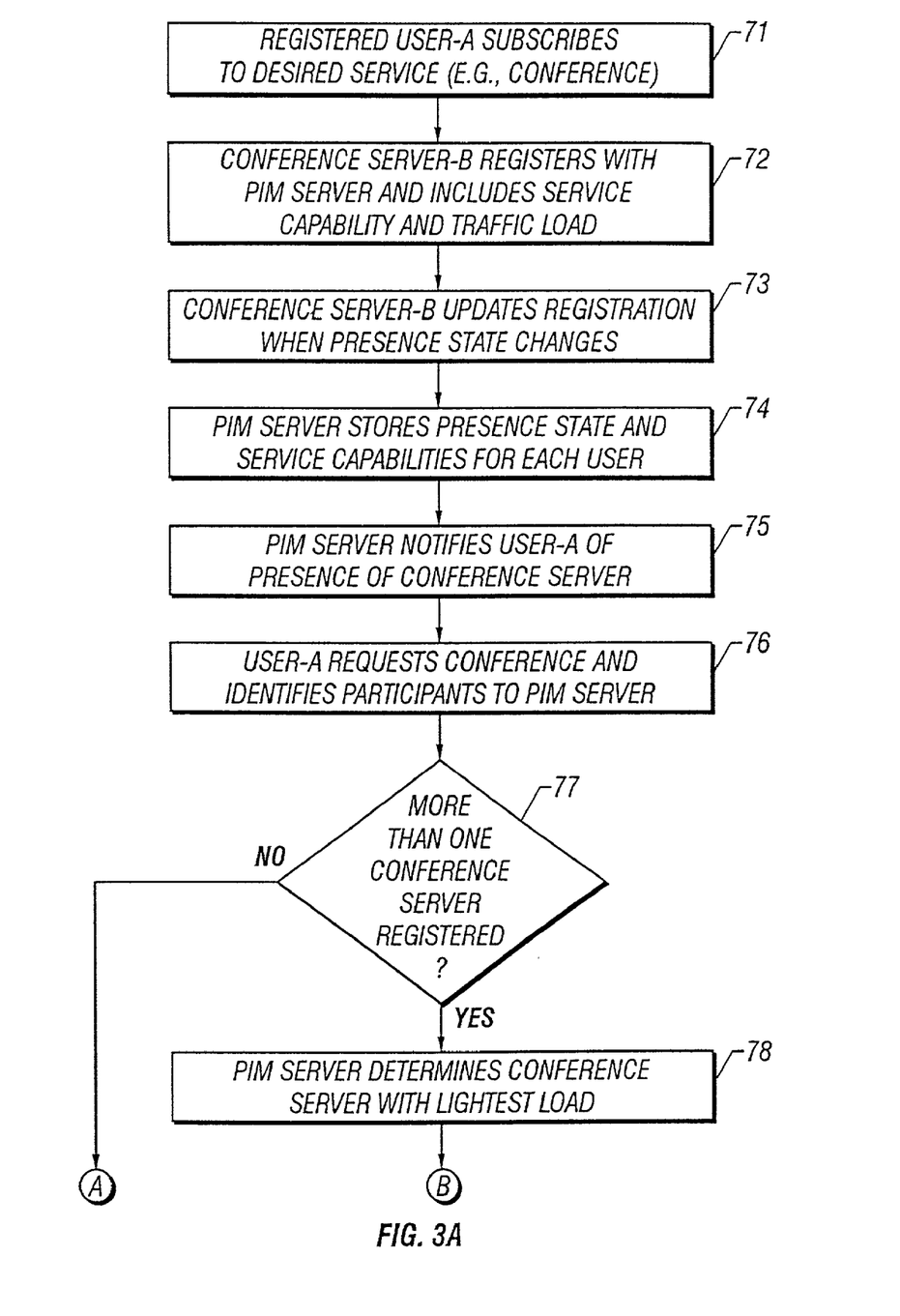
FIGS. 3A and 3B are portions of a flow chart illustrating the steps of the preferred embodiment of the method of the present invention when setting up a conference call.
Figure 3B:
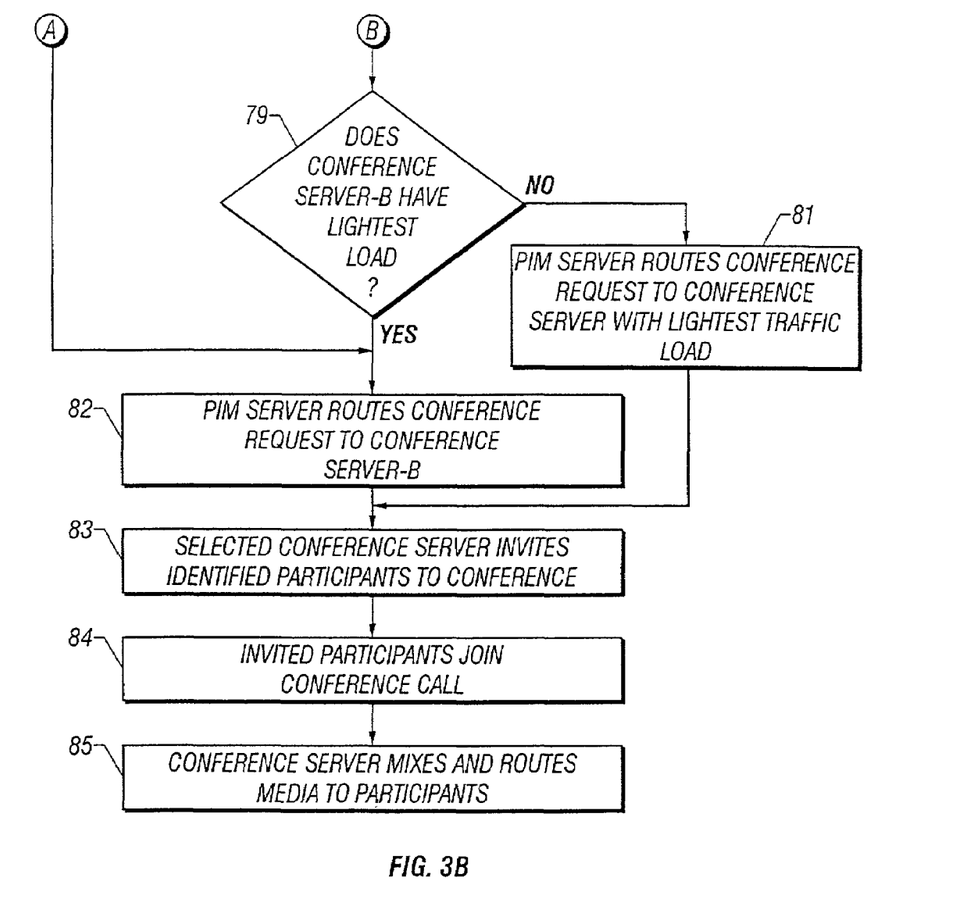

FIGS. 3A and 3B are portions of a flow chart illustrating a first embodiment of the method of the present invention when setting up a conference call. The present invention provides a method for a service node on the network to generically register itself as having specified service types, and having certain capabilities associated with the types of services that it offers. Referring first to FIG. 3A, User-A who has registered with the network and the PIM server, subscribes at step 71 to a desired service such as, for example, a conference service. At step 72, a conference server-B registers with the network and the PIM server. The REGISTER message is modified in the present invention to include the service capabilities of the registering server, and in the case of a conference server, the current traffic load of the server. The conference server sends a new REGISTER message at step 73 if the traffic load changes due to predefined triggering events.

At step 74, the PIM server stores the presence state and the service capabilities of each registered user. The PIM server may include a predefined list of service types that may register as users. Servers providing those service types register as users with the PIM server, but the PIM server knows that they are actually service providers. A number of users can be registered as providing a single service. Preferably, however, a parameter may be added to the REGISTER message at the end of the URI that says, for example, service=conference. With this notation, it is certain that the PIM server will recognize this registration as being a service. If the PIM server does not have that user configured because, for example, it is not capable of handling that type of service registration, an error message is returned. In addition, a greater number of services may be made available since the services would not be restricted to a particular predefined list.

At step 75, the PIM server notifies User-A of the presence of the conference server on the network and the identity of the conference server. User-A can then determine from his terminal that a conference server is available prior to originating a conference call. At step 76, User-A requests a conference call and identifies the participants in the call to his S-CSCF and the PIM server. At step 77, the PIM server determines from its list of service providers whether there is more than one conference server registered. If not, conference server-B is the only registered conference server, and the process moves to step 82 (FIG. 3B) where the PIM server routes the conference request to conference server-B.

However, if it is determined at step 77 that there is more than one conference server registered, the process moves to step 78 where the PIM server determines the conference server with the lightest traffic load. The PIM server is aware of the traffic load of each server since each server sends updated REGISTER messages to the PIM server reporting changes in traffic load due to predefined triggering events. The process then moves to step 79 (FIG. 3B) where it is determined whether conference server-B has the lightest load. If not, the process moves to step 81 where the PIM server routes the conference request to another conference server with the lightest load. However, if conference server-B has the lightest load, the PIM server routes the conference request to conference server-B at step 82.

Figure 4:
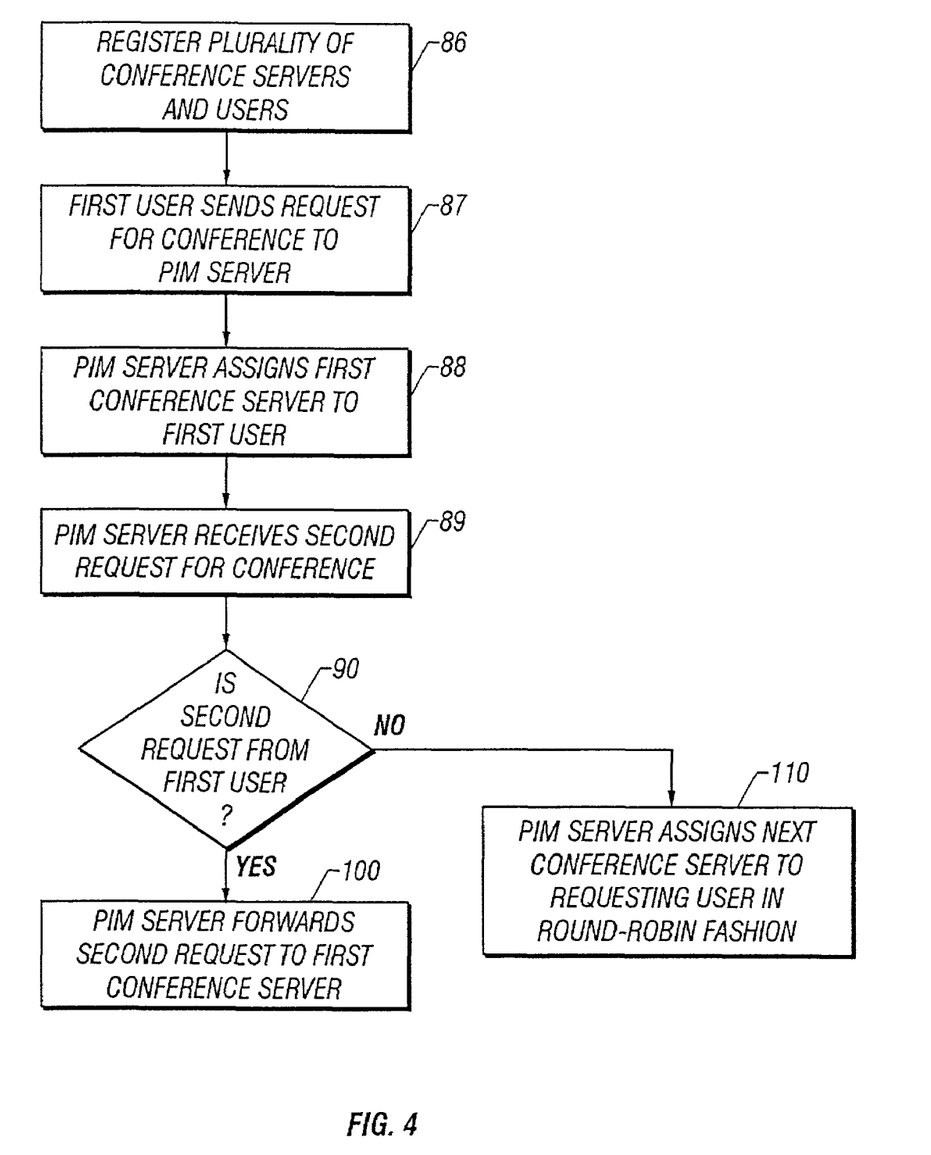
FIG. 4 is a flow chart illustrating a second embodiment of the method of the present invention when setting up a conference call.

Referring briefly to FIG. 4, there is shown a flow chart illustrating a second embodiment of the method of the present invention when setting up a conference call in which the PIM server performs load balancing on a round-robin basis. In this embodiment, conference servers do not have to report their traffic load. At step 86, a plurality of conference servers and users register with the PIM server. When the servers register, the REGISTER message preferably includes an extension that identifies the service capabilities of each registering server. At step 87, a first user sends a request for a conference call to the PIM server. This is preferably done with a REFER message that indicates both the requesting user and the identity of the party to be joined in the conference. At step 88, the PIM server assigns a conference server to the first requesting user.

The requesting user must send a plurality of REFER messages to the PIM server invite all of the parties to the same conference, and the PIM server must forward all of the REFER messages for the same conference to the same conference server. Therefore, the PIM server keeps track of which conference server it assigned to the first requesting user when the first REFER message was received from that user. At step 89, the PIM server receives an additional REFER message requesting a conference call, and at step 90, determines whether the additional request is from the first requesting user. If so, the process moves to step 100 where the PIM server forwards the additional REFER message to the first conference server. For example, the PIM server may check the "From" field in each REFER message, and if the message is from the same requesting user, the PIM server forwards the message to the same conference server. However, if the "From" field indicates a different requesting user, the process moves to step 110 where the PIM server assigns the next registered conference server to that user in round-robin fashion.

Referring again to FIG. 3B, at step 83, the selected conference server invites the identified participants to join the conference call. As discussed below in connection with FIG. 5, this may be done by sending multiple SIP INVITE messages from the conference server to the participants. At step 84, the invited participants join the conference call, and at step 85, the conference server mixes and routes the media to each of the participants.

Figure 5:
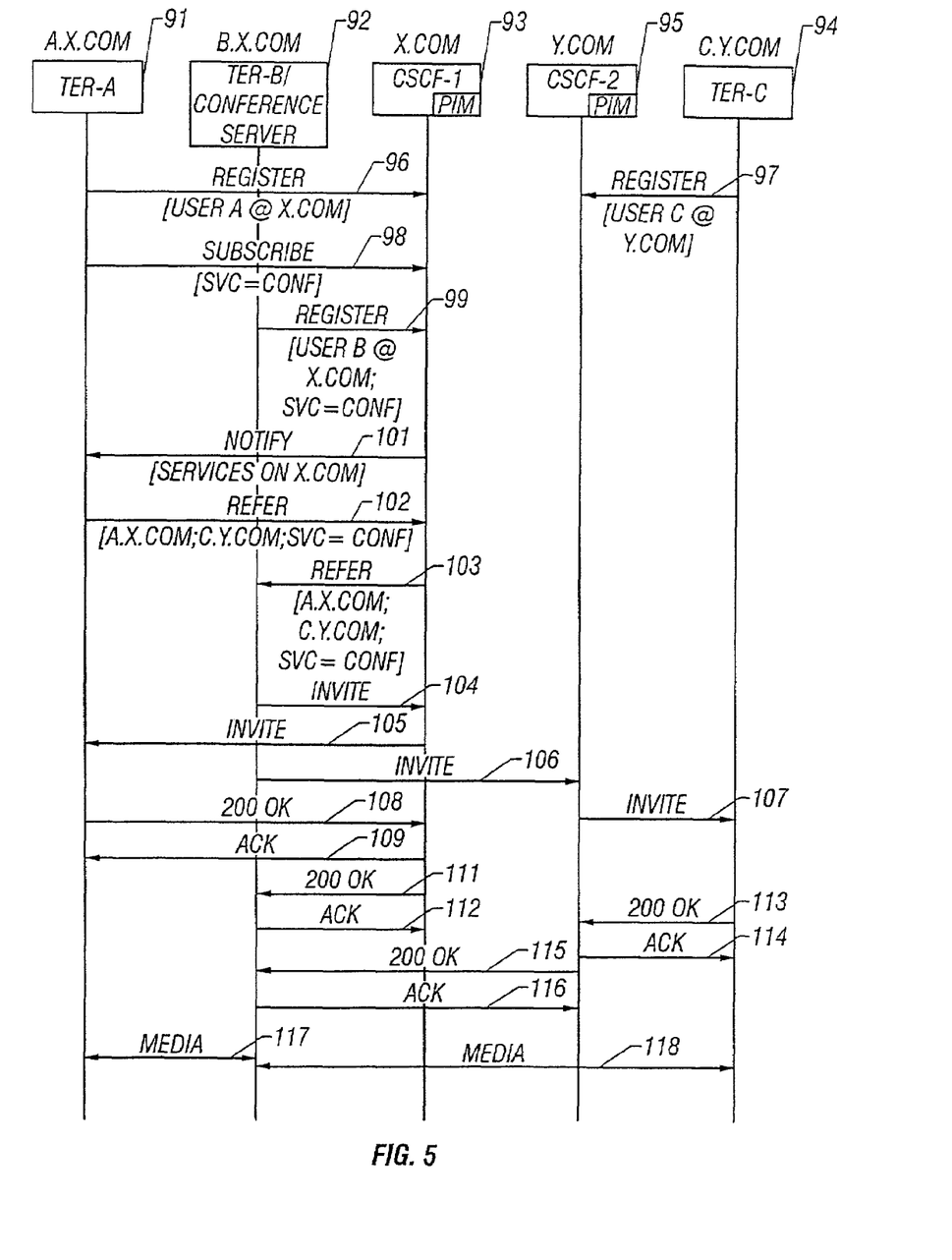
FIG. 5 is a signaling diagram illustrating the flow of messages between nodes in the 3GPP network when performing the method of the present invention.

FIG. 5 is a signaling diagram illustrating the flow of messages between nodes in the 3GPP network when setting up a conference call in accordance with the teachings of the present invention. For simplicity, the separate components of each CSCF have been combined into a single CSCF node. Terminal-A 91 at address a.x.com is requesting a conference call from Terminal-B 92 which is a conference server at address b.x.com. Terminal-A and the conference server are registered with CSCF-1 93 at address x.com. Terminal-A is requesting that Terminal-C 94 at address c.y.com be joined in the call. Terminal-C is registered with CSCF-2 95 at address y.com.

At step 96, Terminal-A 91 sends a REGISTER message to CSCF-1 93 and its associated PIM server, and identifies itself as userA@x.com. Likewise, at step 97, Terminal-C 94 sends a REGISTER message to CSCF-2 95 and its associated PIM server, and identifies itself as userC@y.com. At step 98, Terminal-A sends a SUBSCRIBE message to CSCF-1 and identifies the desired service as the conference service. The SUBSCRIBE message may be formatted as follows:

SUBSCRIBE userA@x.com SIP/2.0
From: "Me"<userA@x.com>;tag=4321
To: "Me"<userA@x.com>;service=conference
. . .

At step 99, Terminal-B 92 sends a REGISTER message to CSCF-1 and its associated PIM server, and identifies itself as userB@x.com. The present invention also places an extension in the REGISTER message that identifies the services supported by the registering entity, in this case, a conference server. The REGISTER message from Terminal-B may be formatted as follows:

REGISTER blinky@x.com SIP/2.0
From: "Conference Server"<blinky@x.com>; service=conference;tag=1234
To: "Conference Server"<blinky@x.com>
. . .
Content-Type: application/service+xml
<users=4>
<media=audio>
<media=video>

In this way, the PIM server does not have to maintain a predefined list of service usernames. Instead, the value of the "service=" parameter reflects the type of service offered.

This greatly reduces the burden on the server because less special provisioning has to be done to accommodate service users.

The body of the message may include descriptive xml or other code describing the node's capabilities and current traffic load. This information is retained by the PIM server so that when a session is requested by a user, the PIM server can forward the request to a server with the correct capabilities. The service may be identified in a service tag at the end of the URI (e.g., service=conference). Alternatively, the source address may identify the service in the form of servicename@domain.com. A new REGISTER message may be sent from the conference server to the PIM server when the presence state of the conference server changes in response to a predefined triggering event. For example, when a conference call is connected, the conference server may send an updated REGISTER message updating the number of ports available. This information may be utilized by the PIM server for load balancing. When multiple conference servers are registered, the network may manage the load between them by selecting more lightly loaded conference servers first. Intelligence in the PIM server performs the load management since the PIM server is aware of every registered conference server and its current load.

Alternatively, a Programmable Interactive Voice Response (P-IVR) unit may be utilized to enable registration from a non-SIP-enabled device. A user having access to such a device dials the P-IVR and makes a selection from an audio menu. One selection may be to register on the SIP network, and another may be to list the current groups and select to join a particular group.

At step 101, the PIM server notifies Terminal-A of the services that are available on x.com (e.g., conference), and provides the address/host name of the applicable conference server 92. The presence state of the conference server may also be reported to the user. For example, the user may be informed that the conference server has registered, but is currently busy. At 102, Terminal-A requests the conference service. This is preferably done by sending a SIP REFER message to the PIM server in CSCF-1. The REFER message from Terminal-A may be formatted as follows:

REFER userA@x.com SIP/2.0
From: "Me" <userA@x.com>;tag=4321
To: "Me" <userA@x.com>; service=conference
Refer-To: "You"<userB@x.com>
Referred-By: "Me"<userA@x.com>
. . .
Content-Type: application/service+xml The PIM server recognizes the service=conference parameter in the "To" field of the REFER message, and replaces the address in the "To" field with the address or host name of the conference server. The PIM server then forwards the message at 103 to the conference server. The REFER message has a Refer-To header arid a Referred-By header that the INVITE message does not have. The Referred-By header identifies the identity of the party requesting the conference call (userA@x.com), and the Refer-To header identifies the address of the party to be connected in the conference call (userB@x.com). An extension identifies the requested service as the conference service.

By sending multiple REFER messages from Terminal-A to the conference server, the conference server can build a list of participants to which it sends out invitations to join the conference. Alternatively, after the conference server responds to the first REFER message, Terminal-A may send all subsequent REFER messages directly to the conference server. This eliminates the requirement for the PIM server to keep track of which users are assigned to which service nodes while allowing the requesting user to continue to send service requests to the conference server.

When there are multiple users registered that provide a particular requested service, the PIM server may send messages to all of the registered users that it knows provide the service. The messages may be SIP INVITE or SIP REFER messages, depending on the requested service. For a conference service, the PIM server preferably sends INVITE messages. From the responses received from the conference servers, the PIM server selects one that is available (and preferably the most lightly loaded), and then connects the users identified for the conference call to the selected conference server.

At 104 and 105, the conference server 92 sends an INVITE message to Terminal-A 91 via CSCF-1 93. At 106 and 107, the conference server sends an INVITE message to Terminal-C 94 via CSCF-2 95. At step 108, Terminal-A indicates its acceptance of the INVITE by returning a SIP 200 OK message to CSCF-1. CSCF-1 responds with an Acknowledgment 109 and forwards the 200 OK message to the conference server at 111. The conference server responds with an Acknowledgment 112. Likewise, at step 113, Terminal-C indicates its acceptance of the INVITE by returning a SIP 200 OK message to CSCF-2. CSCF-2 responds with an Acknowledgment 114 and forwards the 200 OK message to the conference server at 115. The conference server responds with an Acknowledgment 116. The conference server then mixes the media and routes the media to Terminal-A at 117 and to Terminal-C at 118.

The invention also enables the registration of a service as a group of users. By requesting the service, users can be added to the group and communicate with each other. For example, an owner of a game server may host a quiz game. The owner may register as a service with the capability of a quiz game that can be played, for example, by a minimum of two and a maximum of four players who send text messaging back and forth. The server looks like a user as far as the semantics of the messages, but the PIM server knows that this is a group. Anything that a player sends to the group is sent to the person who registered as the owner of the group. Anything that the owner sends to the group is broadcast to all of the players. Thus, during the game, a question is sent from the server to the participants, and answers are sent from the participants to the server when the participants type an answer and hit "enter".

Figure 6:
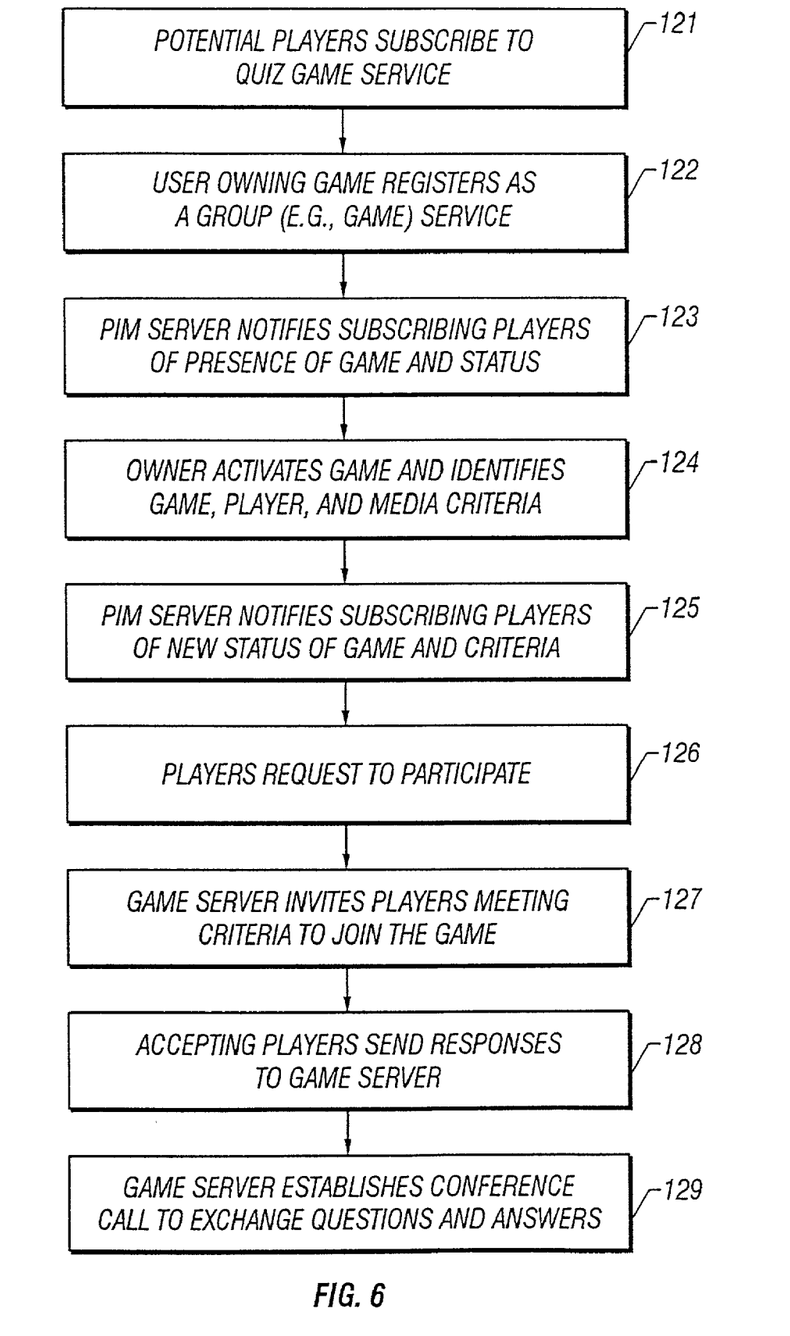
FIG. 6 is a flow chart illustrating the steps of the preferred embodiment of the method of the present invention when establishing a group.

FIG. 6 is a flow chart illustrating the steps of the preferred embodiment of the method of the present invention when establishing a group such as a quiz game. Players who are interested in quiz games may subscribe to a quiz game service at step 121. At step 122, the user owning the game registers with the network and the PIM server as a group service (e.g., quiz game server). The REGISTER message may indicate that the game is available now, or is currently not available. The owner may specify certain conditions such as a minimum number of players who must register before the game will be invoked, and a maximum number of players who may join the game. At step 123, the players subscribing to the quiz game service are notified by the PIM server of the presence of the quiz game service, and its current status. The PIM server monitors the number of players registered and their status, and may also notify the game server when the predetermined number of players are registered and available.

The game server is aware of members on other CSCFs because it gets a notification of their subscription. If the game server needs to verify their presence state (whether they are online, off line, busy, etc.), it can send a reciprocating subscriber message to the home domain of each player to obtain notifications as the players change state. The address of the player's I-CSCF may be obtained by performing a special CSCF DNS lookup on the player's domain name. The address of the player's home I-CSCF is all the information that the game server needs because the I-CSCF then determines the player's status from the HSS or S-CSCF serving the player.

Alternatively, during the initial registration process, rather than waiting for all of the conditions to be satisfied before invoking the game, the PIM server may send a notification to the owner each time a particular condition such as a new registration by a particular player occurs. The owner then has the option of overriding the previously identified conditions and invoking the service nevertheless.

At 124, the owner activates the game and sends an update REGISTER message identifying, for example, the number of players, player criteria or IDs, media type, and so on. At step 125, potential players are notified of the new status of the quiz game service and the criteria for playing the game. At step 126, interested players request to participate in the game.

At step 127, the game server invites players meeting the criteria to join the game. At 128, players accepting the invitation send responses to the game server. At step 129, a conference call is established by the game server between the game server and the players joined in the call. The game server mixes the media and routes the media to the various players for the exchange of game questions and answers.

Figure 7A:
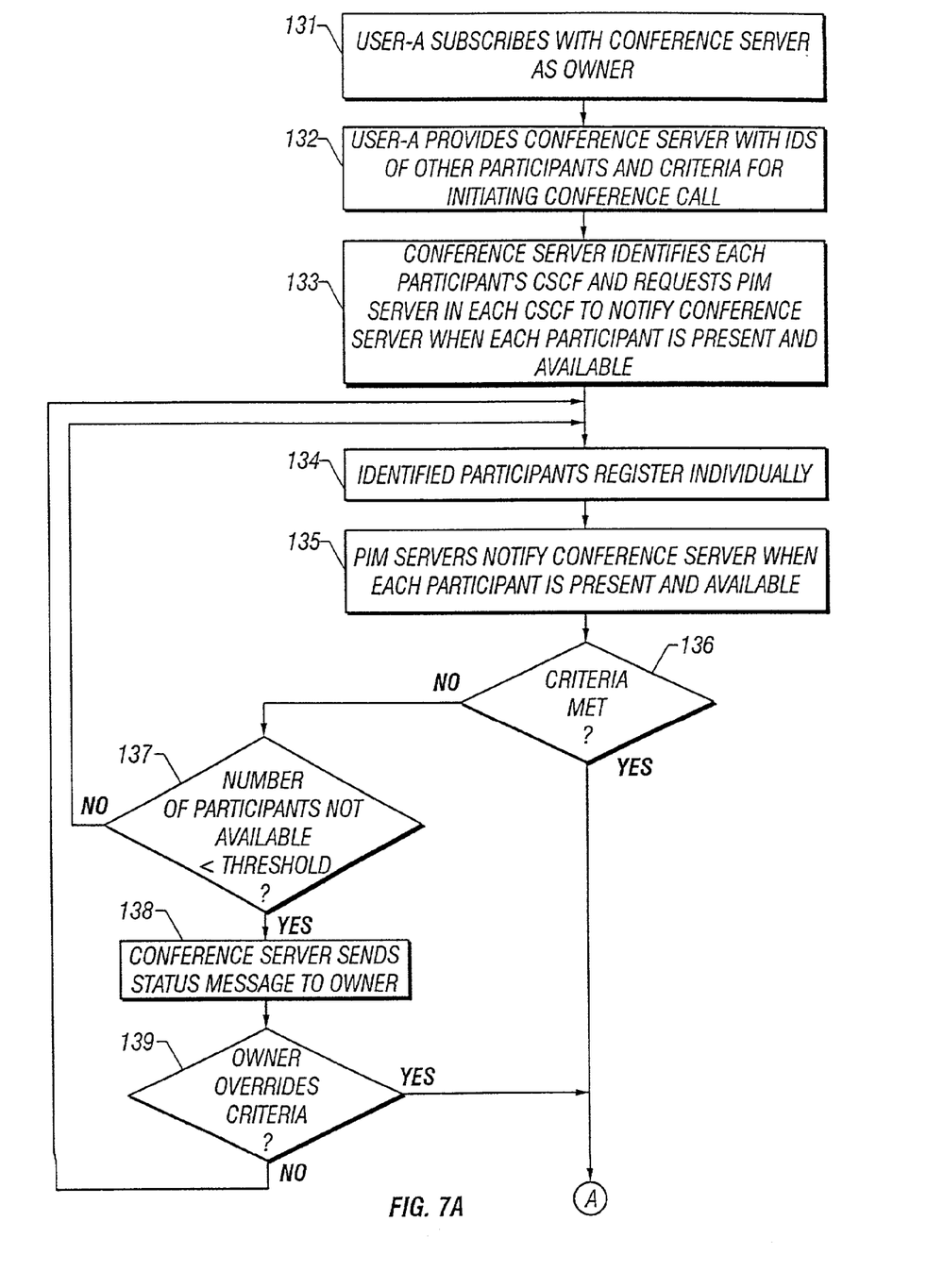
FIGS. 7A and 7B are portions of a flow chart illustrating an embodiment of the method of the present invention when a conference call is initiated by a conference server.
Figure 7B:
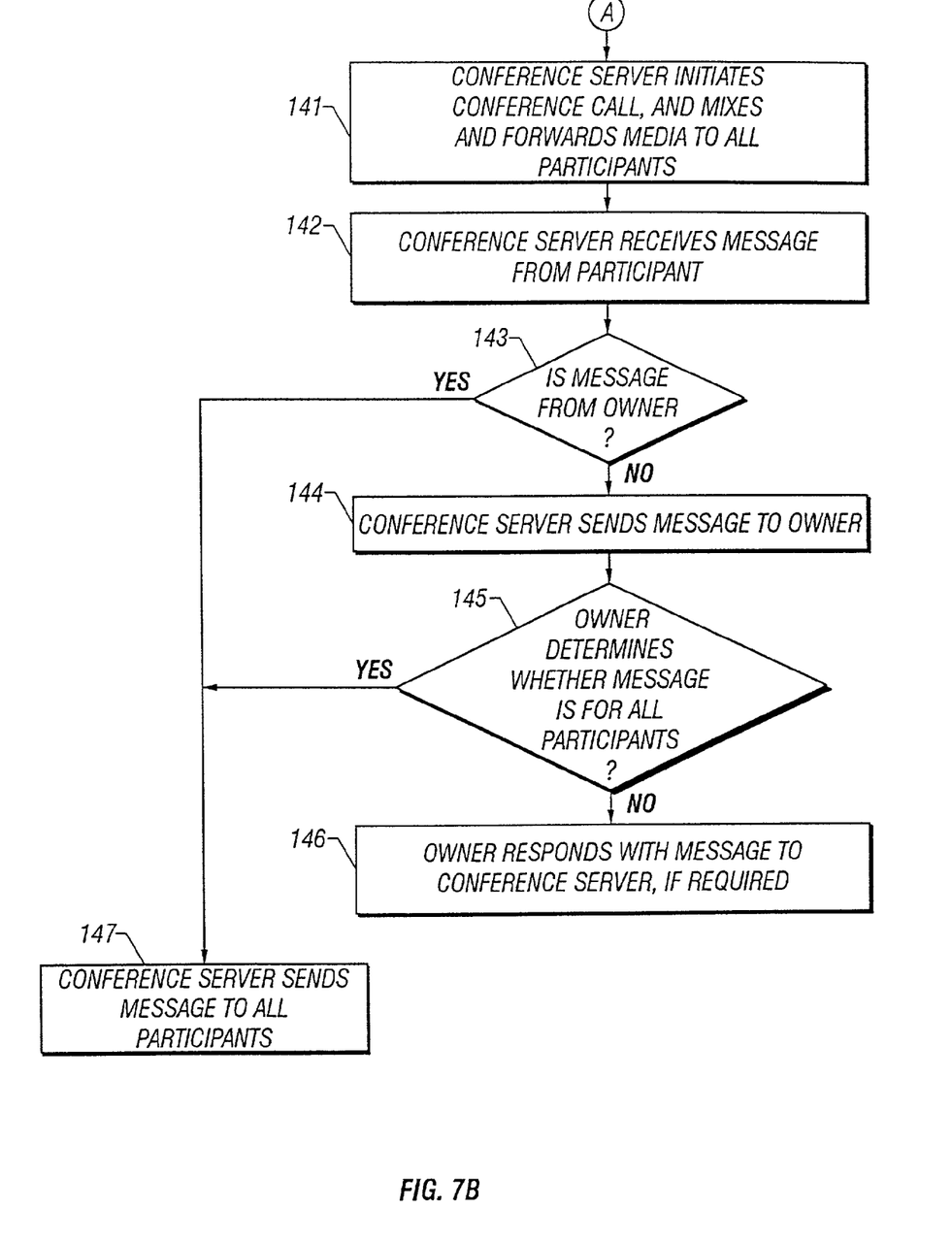

FIGS. 7A and 7B are portions of a flow chart illustrating an embodiment of the method of the present invention when a conference call is initiated by a conference server. At step 131, a particular user such as User-A subscribes with a conference server as an owner. At step 132, User-A provides the conference server with a number of criteria for initiating a conference call. Such criteria may include, for example, a minimum number of participants, a maximum number of participants, a possible start time or end time for the conference call, the names or addresses of participants, whether each of those identified participants (aliases) are mandatory, optional or alternative participants, and a threshold number of participants at which the owner may override the criteria and instruct the conference server to initiate the conference call.

At step 133, the conference server, in response to User-A's subscription, identifies each participant's S-CSCF and requests the PIM server in each CSCF to notify the conference server when each of the identified participants are "present" and available. At step 134, the identified participants individually register with their S-CSCFs and consequently, with the PIM server therein. The REGISTER messages also indicate whether each participant is currently available. At step 135, each PIM server notifies the conference server whenever a participant being served by that PIM server is present and available. As notifications are received from each PIM server as to the availability of each of the identified participants, the conference server compares the current status against the predefined criteria at step 136, and determines whether a conference call should be initiated.

If the criteria for initiating a conference call are met, the process moves to step 141 of FIG. 7B where the conference server initiates the conference call. However, if the criteria for initiating a conference call are not met, the process moves to step 137 where the conference server determines whether the number of participants not available, or otherwise not meeting the criteria, are less than the predefined threshold number at which the owner may override the criteria and instruct the conference server to initiate the conference call. If the number of non-available participants is not below the threshold, the process returns to step 134 and continues to wait for additional registrations from identified participants.

However, if the number of non-available participants is below the threshold, the process moves to step 138 where the conference server sends a status report or message to the owner regarding the number of available participants, and the identity of any non-available participants. At step 139, the owner then has the option of overriding the remaining criteria and initiating the conference call. If the owner does not override the criteria, the process returns to step 134 and continues to wait for additional registrations from identified participants. However, if the owner overrides the criteria, the process moves to step 141 of FIG. 7B where the conference server initiates the conference call.

Referring now to FIG. 7B, the conference server initiates the conference call at step 141 by, for example, sending a SIP INVITE message to each of the participants. After all of the participants have joined the conference, the conference server mixes and forwards the media to the owner and all of the other identified participants, as required. At step 142, the conference server receives a message from one of the participants. At step 143, the server determines whether the message is from the owner. Any message sent from the owner to the server is to be transmitted to all of the members, so the process moves to step 147 where the conference server sends the message to all participants. However, any message sent from one of the participants other than the owner, is to be transmitted only to the owner. Therefore, if it is determined at step 143 that the message is not from the owner, the process moves to step 144 where the conference server sends the message to the owner.

The owner then has the option of sending the message back to the server or instructing the server to transmit the received message to the rest of the participants. Thus, at step 145 the owner determines whether the message is a message that should be sent to all participants in the conference call. If not, the process moves to step 146 where the owner responds to the message by sending a response message back to the conference server. However, if the owner determines that the message is a message that should be sent to all participants, the process moves to step 147 where the conference server sends the message to all participants in the conference call. It should be noted that users with non-SIP devices can participate in such a conference call by registering through a P-IVR.

Figure 8:
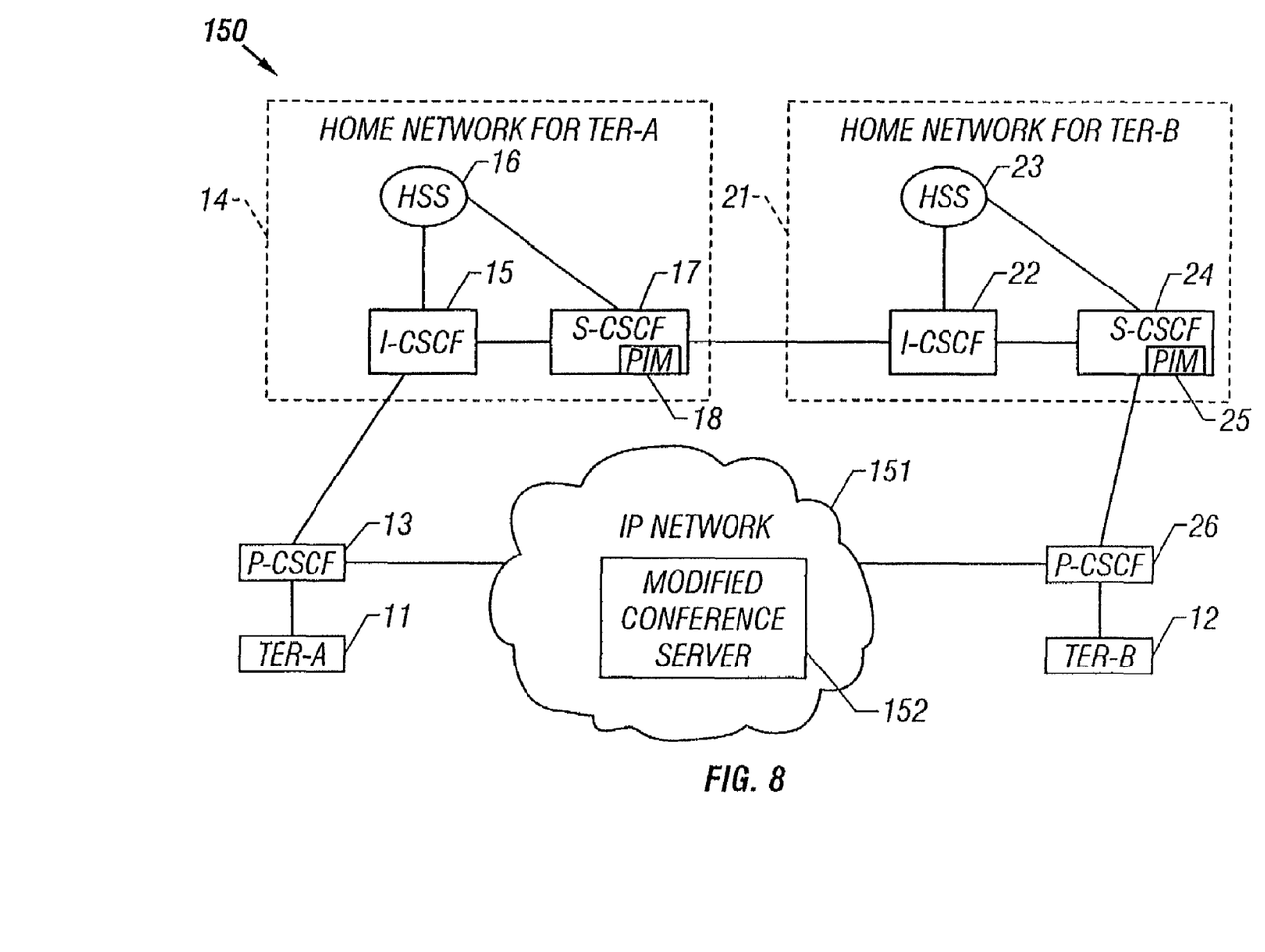
FIG. 8 is a simplified block diagram of a portion of a 3GPP network architecture that has been modified in accordance with the teachings of the present invention to perform the method illustrated in FIGS. 7A and 7B.

FIG. 8 is a simplified block diagram of a portion of a 3GPP network architecture 150 that has been modified in accordance with the teachings of the present invention to perform the method illustrated in FIGS. 7A and 7B. IP network 151 is shown to include a Modified Conference Server 152. The Modified Conference Server is a separate IP node capable of sending and receiving SIP messages to the SIP control network portion (CSCF, PIM, etc.) 11–26 as well as routing and transmitting IP data packets. Once a particular user subscribes with the Modified Conference Server as an owner, and provides the Modified Conference Server with the criteria for initiating a conference call, the Modified Conference Server monitors the status of the identified participants, as reported by their PIM servers, and determines whether the criteria have been met. When all of the participants are available, and the criteria are otherwise met or overridden by the owner, the Modified Conference Server communicates with the participants' CSCFs to invite the participants and to initiate the conference call. Once a conference call is initiated, the Modified Conference Server remains in the established communication link, and forwards and delivers messages transmitted by the participants, as described in FIGS. 7A and 7B.

It is believed that the operation and construction of the present invention will be apparent from the foregoing Detailed Description. While the system and method shown and described have been characterized as being preferred, it should be readily understood that various changes and modifications could be made therein without departing from the scope of the present invention as set forth in the following claims. For example, it should be clear to those skilled in the art that the present invention is not limited to providing a conference service, but may be practiced to provide any other services and features available within a data communications network. For example, different services may include a server that registers as a Public Switched Telephone Network (PSTN) gateway which enables a SIP user to call a PSTN subscriber. Likewise, a 2G phone can be registered in the SIP network if the phone calls into a signaling gateway.

Additionally, whereas the use of a specific network architecture and specific messages and signaling protocols has been described in reference to the presently preferred exemplary embodiment of the present invention, such architectures and signaling implementations are merely illustrative. As an illustration, the separate service (service host) may reside within the home S-CSCF or alternatively, it could be in another network node within the IP network. Such an alternative network node may be a Media Resource Service (MRS) node within an existing IP network. In this case, the S-CSCF routes a service request signal to the identified service host. The service host then initiates calls between the original user who is identified as the owner and all other registered members. The media path is established between all members via the service host. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method in an Internet Protocol (IP) telecommunications network of establishing a conference call between a first user as a conference owner and a plurality of other users as conference participants, said network including a conference server and at least one Serving Call State Control Function (S-CSCF) providing call control functions for the users, said method comprising:

registering with a first S-CSCF serving the first user, the first user as the conference owner;

identifying the conference participants to the first S-CSCF;

identifying by the first S-CSCF, each participant's assigned S-CSCF;

sending a request from the first S-CSCF to each participant's S-CSCF requesting each S-CSCF to notify the first S-CSCF when a predefined criterion for initiating the conference call has been met by the participant being served by the participant's S-CSCF;

detecting by each participant's S-CSCF, when each participant has met the predefined criterion;

sending a notification from each participant's S-CSCF to the first S-CSCF when each participant being served by the participant's S-CSCF has met the predefined criterion;

determining by the first S-CSCF whether the participants have met the predefined criterion for initiating the conference call;

instructing the conference server to initiate the conference call upon determining that the participants have met the predefined criterion;

receiving by the conference server, a message from one of the users;

determining by the conference server, whether the message is from the owner or one of the other participants;

forwarding the message from the conference server to all of the participants, upon determining that the message is from the owner; and forwarding the message from the conference server to the owner only, upon determining that the message is from one of the other participants.

2. The method of establishing a conference call of claim 1 further comprising, after identifying the conference participants, the step of providing by the conference owner, predefined criteria for initiating the conference call, said criteria including a predefined number of participants who are present and available.

3. The method of establishing a conference call of claim 2 wherein the step of providing predefined criteria includes providing a minimum number of participants who must be present and available, and a maximum number of participants who are allowed to participate in the conference call.

4. The method of establishing a conference call of claim 2 wherein the step of providing predefined criteria includes identifying whether each identified participant is a mandatory participant or an optional participant.

5. The method of establishing a conference call of claim 2 wherein the step of providing predefined criteria includes providing a starting time for the conference call.

6. The method of establishing a conference call of claim 1 wherein each participant's S-CSCF includes a Presence and Instant Messaging (PIM) server, and the step of detecting when each participant has met the predefined criterion includes detecting by the PIM server in each participant's S-CSCF when each participant is present and available.

7. The method of establishing a conference call of claim 6 wherein the telecommunications network utilizes Session Initiation Protocol (SIP) for call-control signaling, and the step of detecting by the PIM server in each participant's CSCF when each participant is present and available includes receiving by the PIM server a SIP REGISTER message from each participant when the participant is present and available.

8. The method of establishing a conference call of claim 7 wherein the step of receiving by the PIM server a SIP REGISTER message from each participant when the participant is present and available includes receiving a SIP REGISTER message from a Programmable Interactive Voice Response (P-IVR) unit for participants who are utilizing a non-SIP-enabled communications device.

9. The method of establishing a conference call of claim 1 further comprising, after the step of determining whether the participants have met the predefined criterion for initiating the conference call, the steps of:

sending a status message from the first S-CSCF to the owner, upon determining that the participants have not met the predefined criterion;

determining whether the owner overrides the predefined criterion; and initiating the conference call, upon determining that the owner has overridden the predefined criterion.

10. A system in an Internet Protocol (IP) telecommunications network for establishing a conference call between a first user as a conference owner and a plurality of other users as conference participants, said network including a conference server and each of said users being served by a Serving Call State Control Function (S-CSCF) providing call control functions for the users, said system comprising:
   a first S-CSCF serving the first user, comprising:
      means for registering the first user as the conference owner and receiving from the owner, identifications of the conference participants;
      means for identifying each participants assigned S-CSCF;
      communication means for sending a request to each participant's S-CSCF and receiving a notification from each participant's S-CSCF, said request requesting the participant's S-CSCF to notify the first S-CSCF when a predefined criterion for initiating the conference call has been met by the participant being served by the participant's S-CSCF;
      means for determining whether the participants have met the predefined criterion for initiating the conference call; and
      means for instructing a conference server to initiate the conference call upon determining that the participants have met the predefined criterion;
   conferencing means for initiating and conducting the conference call when instructed by the first S-CSCF; and
   a Presence and Instant Messaging (PIM) server in each participant's S-CSCF comprising:
      means for determining whether each participant has met the predefined criterion; and
      communication means for sending the notification to the first S-CSCF when each participant being served by the participant's S-CSCF has met the predefined criterion,
   means in said conference server for receiving a message from one of the users, wherein said conference server determines whether the message is from the owner or one of the other participants, the conference server forwarding the message to all of the participants if the message is from the owner and forwarding the message to the owner if the message is from one of the other participants.

11. In an Internet Protocol (IP) telecommunications network, an owner's Serving Call State Control Function (S-CSCF) that serves a conference owner and instructs a conference server to initiate a conference call between the conference owner and a plurality of conference participants when predefined criteria have been met, said owner's S-CSCF comprising:
   means for registering the conference owner and receiving from the owner, identifications of the conference participants;
   means for identifying each participant's S-CSCF;
   communication means for:
      sending a request to each participant's S-CSCF requesting the participant's S-CSCF to notify the owner's S-CSCF when a predefined criterion for initiating the conference call has been met by the participant being served by the participant's S-CSCF; and
      receiving a notification from each of the participant's S-CSCFs when the participant being served by the participant's S-CSCF has met the predefined criterion;
   means in said conference server for receiving a message from one of the users, wherein said conference server determines whether the message is from the owner or one of the other participants, the conference server forwarding the message to all of the participants if the message is from the owner and forwarding the message to the owner if the message is from one of the other participants;
   means for determining whether the participants have met the predefined criterion for initiating the conference call; and
   means for instructing a conference server to initiate and conduct the conference call upon determining that the participants have met the predefined criterion.

12. A method in an Internet Protocol (IP) telecommunications network of establishing a conference call between a first user as a conference owner and a plurality of other users as conference participants, said network including a conference server and at least one Call State Control Function (CSCF) providing call control functions for the users, said method comprising:
   registering with the conference server, the first user as the conference owner:
   identifying by the conference owner, the conference participants;
   identifying by the conference server, each participant's CSCF;
   sending a request from the conference server to each participant's CSCF requesting the CSCF to notify the conference server when a predefined criterion for initiating the conference call has been met by the participant being served by the CSCF;
   detecting by each participant's CSCF, when each participant has met the predefined criterion;
   sending a notification from each participant's CSCF to the conference server when each participant being served by the CSCF has met the predefined criterion;
   determining by the conference server whether the participants have met the predefined criterion for initiating the conference call; and
   initiating the conference call upon determining that the participants have met the predefined criterion.
   receiving by the conference server, a message from one of the users;
      determining by the conference server, whether the message is from the owner or one of the other participants;
      forwarding the message from the conference server to all of the participants, upon determining that the message is from the owner; and
      forwarding the message from the conference server to the owner only, upon determining that the message is from one of the other participants.

* * * * *